US010076797B2

(12) United States Patent
Pierce et al.

(10) Patent No.: US 10,076,797 B2
(45) Date of Patent: Sep. 18, 2018

(54) CUTTING APPARATUS INCLUDING A WIRE CUTTING MEMBER

(71) Applicant: ILLINOIS TOOL WORKS INC., Glenview, IL (US)

(72) Inventors: Kenneth R. Pierce, Arlington Heights, IL (US); Michael W. Gearhart, Prospect Heights, IL (US); Roy C. Coakley, Northlake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 602 days.

(21) Appl. No.: 14/507,502

(22) Filed: Oct. 6, 2014

(65) Prior Publication Data

US 2015/0101471 A1  Apr. 16, 2015

Related U.S. Application Data

(60) Provisional application No. 61/889,624, filed on Oct. 11, 2013.

(51) Int. Cl.
*B23D 57/00* (2006.01)
*B26D 1/48* (2006.01)

(52) U.S. Cl.
CPC ..... *B23D 57/0069* (2013.01); *B23D 57/0038* (2013.01); *B23D 57/0092* (2013.01); (Continued)

(58) Field of Classification Search
CPC ............ B23D 57/0069; B23D 57/0038; B23D 57/0092; B23D 55/04; B23D 55/043; (Continued)

(56) References Cited

U.S. PATENT DOCUMENTS 1,530,682 A * 3/1925 Lyman .................. B23D 53/12
30/380
2,617,678 A 11/1952 Kelso
(Continued)

FOREIGN PATENT DOCUMENTS

AU  2010 201 367 A1  11/2010
CN  200957639 Y   10/2007
(Continued)

OTHER PUBLICATIONS

Database WPI, Week 199216, Thomson Scientific, London, GB; AN 1992-130534; XP00288559, & SU 1 662 866 A (Metsatunyants. E) Jul. 15, 1991 (Jul. 15, 1991) Abstract.
(Continued)

*Primary Examiner* — Jason Daniel Prone
*Assistant Examiner* — Richard Crosby, Jr.
(74) *Attorney, Agent, or Firm* — Klintworth & Rozenblat IP LLP

(57) ABSTRACT

A cutting apparatus includes a wire cutting member, a plurality of wheels about which the wire cutting member is at least partially wrapped, a first arm member supporting at least one of the plurality of wheels, and a second arm member supporting at least one of the plurality of wheels. The first arm member and the second arm member may be moveable between a first position, in which the cutting apparatus has a first size, and a second position, in which the cutting apparatus has a second size larger than the first size. A wire saw includes an adjustment member coupled to at least one of a plurality of wheels for moving the at least one of the plurality of wheels to adjust a tension of a wire cutting member. A wire saw includes a visual indicator for indicating an amount of tension applied to a wire cutting member.

21 Claims, 14 Drawing Sheets

(52) U.S. Cl.
CPC ............ B26D 1/48 (2013.01); *B23D 57/0061* (2013.01); *Y10T 83/852* (2015.04); *Y10T 83/9292* (2015.04)

(58) Field of Classification Search
CPC .... B23D 55/046; B23D 55/065; B23D 57/00; B23D 57/003; B23D 57/0046; B23D 57/0053; B23D 57/0061; B27B 17/14; B27B 13/00; B27B 13/08; B26D 1/48
USPC .................................. 83/814–819, 743–745
See application file for complete search history.

(56) References Cited

U.S. PATENT DOCUMENTS

| | | | |
|---|---|---|---|
| 2,711,761 A | 6/1955 | Grants | |
| 3,172,384 A | 3/1965 | Tipton | |
| 3,820,424 A * | 6/1974 | George, Jr. | B23B 5/168 82/101 |
| 3,958,332 A * | 5/1976 | Gates | B23D 57/0007 30/380 |
| 4,091,533 A | 5/1978 | Saumell | |
| 4,212,104 A | 7/1980 | Wikoff | |
| 4,449,271 A | 5/1984 | Karubian | |
| 4,463,638 A * | 8/1984 | Fortin | B23D 55/02 83/564 |
| H0000045 H | 4/1986 | Gilmore | |
| H000045 H * | 4/1986 | Gilmore | B24B 23/00 30/392 |
| 4,705,331 A | 11/1987 | Britton | |
| 5,361,748 A | 11/1994 | Matteucci | |
| 5,363,558 A * | 11/1994 | Schroeder | B23D 57/0069 30/380 |
| 5,388,334 A * | 2/1995 | Halsey | B23D 53/08 30/123 |
| 5,524,517 A | 6/1996 | Robinson | |
| 5,875,771 A * | 3/1999 | Plattner | B23D 57/0053 125/12 |
| 6,267,037 B1 * | 7/2001 | McCoy, Jr. | B23D 57/0007 83/745 |
| 7,406,905 B2 * | 8/2008 | Lawler | B23D 57/0061 125/21 |
| 7,645,093 B1 | 1/2010 | Clark et al. | |
| 7,922,424 B2 * | 4/2011 | Clark, II | B23D 57/0007 405/156 |
| 8,029,036 B2 * | 10/2011 | Kline | B66C 1/427 254/93 R |
| 8,047,194 B2 * | 11/2011 | Rieger | B23D 57/003 125/21 |
| 8,109,693 B1 | 2/2012 | Clark, II | |
| 8,286,625 B2 * | 10/2012 | Jenkins | B23D 57/0007 125/12 |
| 8,465,227 B1 | 6/2013 | Clark, II | |
| 8,475,081 B2 | 7/2013 | Clark et al. | |
| 8,651,098 B2 * | 2/2014 | Shae | B23D 57/0007 125/16.02 |
| 8,833,219 B2 * | 9/2014 | Pierce | B23D 57/0007 30/102 |
| 9,186,805 B2 * | 11/2015 | Swiatowy | B23D 57/0084 |
| 9,457,490 B2 * | 10/2016 | Oberg | B23D 57/0053 |
| 9,827,624 B2 * | 11/2017 | Pierce | B26D 7/02 |
| 9,889,575 B2 * | 2/2018 | Swiatowy | B26D 3/16 |
| 2008/0022830 A1 | 1/2008 | Lawler et al. | |
| 2009/0314149 A1 | 12/2009 | Clark, II | |
| 2010/0186564 A1 | 7/2010 | Pierce | |
| 2012/0174723 A1 | 7/2012 | Matteucci | |
| 2013/0061730 A1 * | 3/2013 | Swiatowy | B23D 57/0084 83/452 |
| 2014/0352506 A1 * | 12/2014 | Harper | B23D 57/0038 83/14 |
| 2015/0027287 A1 * | 1/2015 | Harper | B23D 57/0038 83/651.1 |
| 2018/0065266 A1 * | 3/2018 | Swiatowy | B23D 57/0069 |

FOREIGN PATENT DOCUMENTS

| | | |
|---|---|---|
| CN | 102046316 A | 5/2011 |
| CN | 102067288 A | 5/2011 |
| DE | 10 2004 018672 A1 | 11/2005 |
| EP | 0 540 834 82 | 5/2004 |
| EP | 1 598 161 A1 | 11/2005 |
| GB | 2394694 | 5/2004 |
| JP | H01 223294 A | 9/1989 |
| JP | 07150775 | 6/1995 |
| JP | 2012 135872 A | 7/2012 |
| KR | 20090105764 | 10/2009 |
| KR | 2010027354 | 3/2010 |
| NO | 180185 | 4/2008 |
| SU | 1662866 A1 | 7/1991 |
| WO | 2009/146294 | 12/2009 |

OTHER PUBLICATIONS

European Patent Office, International Searching Authority, International Search Report and Written Opinion for PCT/US2012/058408, dated Dec. 19, 2012.
Australian Examination Report in connection with Australian Patent Application No. 2010206882 dated Apr. 9, 2014, 6 pages.
International Search Report and Written Opinion for PCT/US2014/059619 dated Jan. 28, 2015, 11 pages.

* cited by examiner

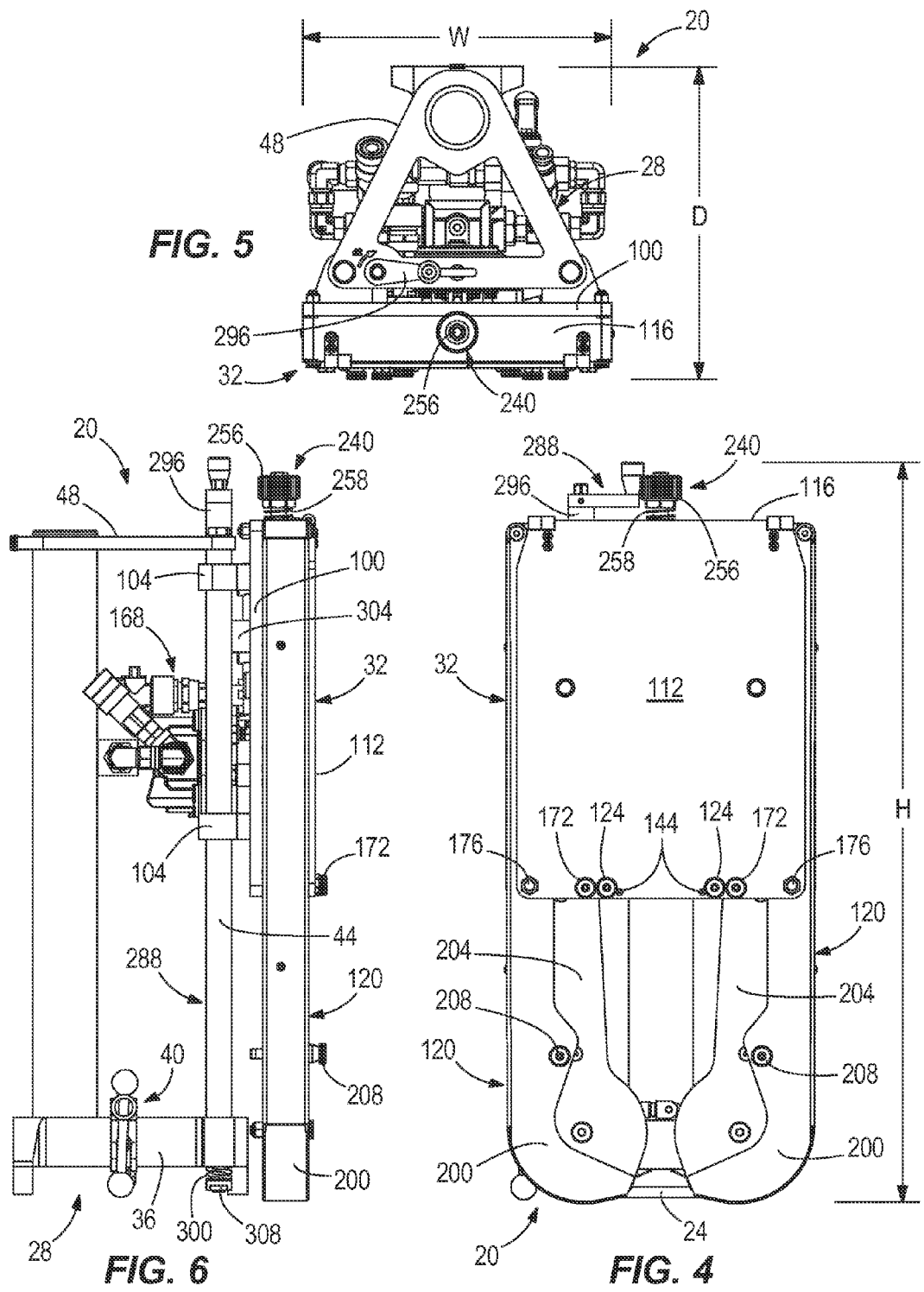

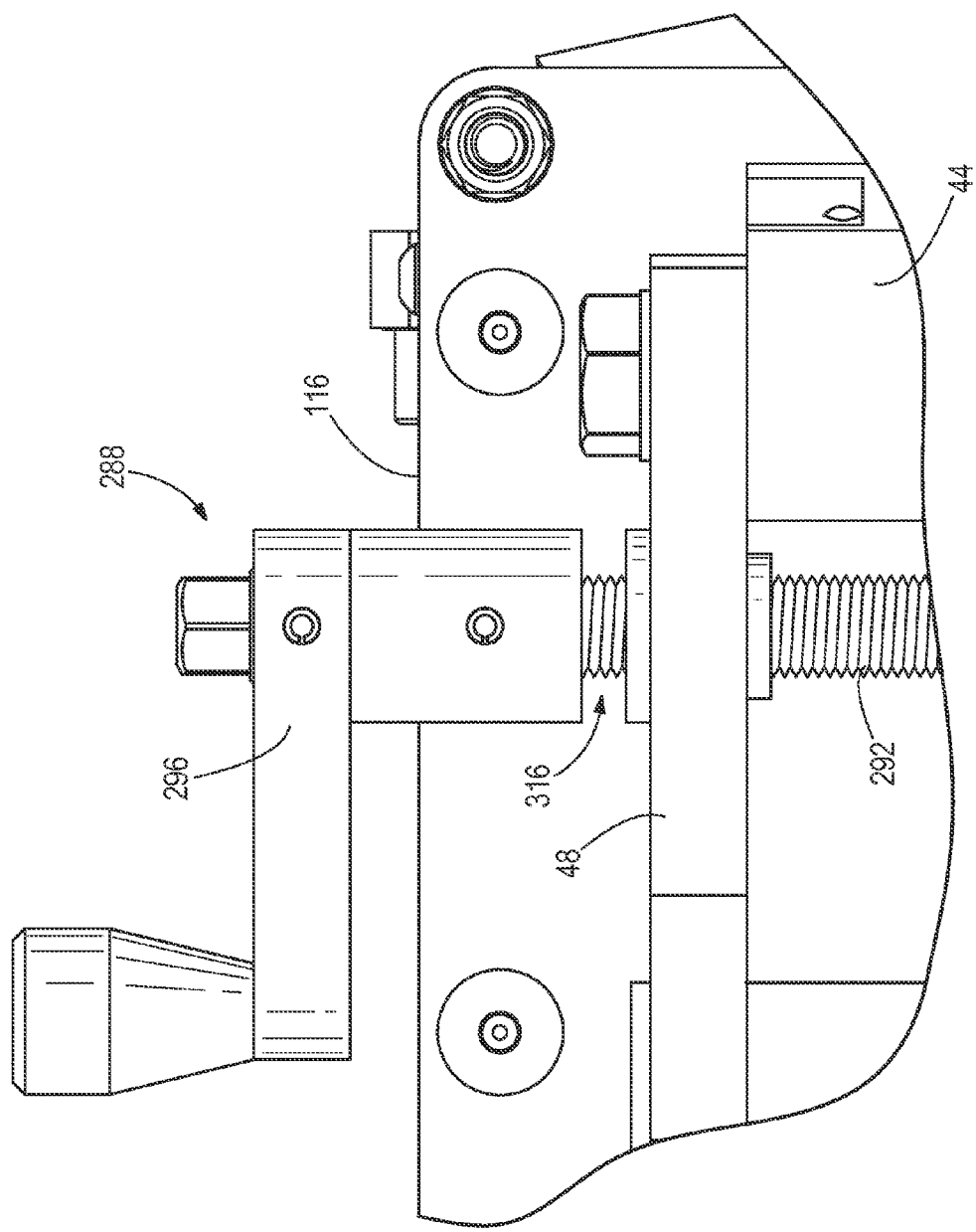

US 10,076,797 B2

CUTTING APPARATUS INCLUDING A WIRE CUTTING MEMBER

RELATED APPLICATIONS

The present application claims the priority benefit of U.S. Provisional Patent Application No. 61/889,624, filed Oct. 11, 2013, the content of which is incorporated by reference herein in its entirety.

FIELD OF THE INVENTION

The present disclosure generally relates to cutting apparatuses and, more particularly, to cutting apparatuses including wire cutting members for cutting objects such as pipes.

BACKGROUND

Cutting apparatuses including a wire for cutting products are generally referred to as wire saws. Wire saws are bulky items and may be unsafe to operate. The bulky wire saws are limited in the environments in which they may be operated and consume large spaces when not in use. Moreover, wire saws may not adequately couple to pipes or the operator may operate the wire saw in an unsafe position, thereby putting the operator in danger when operating the wire saws.

SUMMARY

The present disclosure is defined by the following claims, and nothing in this section should be taken as a limitation on those claims.

It is therefore desirable to have a cutting apparatus including a wire cutting member that is compact and safe to operate. A wire saw that is compact will be utilized in more environments and a safe wire saw will decrease exposure of the operator to danger while operating the wire saw.

In one aspect, a cutting apparatus is provided.

In one aspect, a method of cutting an object with a cutting apparatus is provided.

In one aspect, a wire saw is provided.

In one aspect, a method of cutting an object with a wire saw is provided.

In one aspect, a cutting apparatus is provided and is moveable between a first position and a second position, and the cutting apparatus is more compact in the first position than in the second position. The cutting apparatus may include a first width of about 12 inches and a first depth of about 12 inches when in the first position and a second width greater than 12 inches when in the second position.

In one aspect, a cutting apparatus is provided and includes a wire cutting member, a plurality of wheels about which the wire cutting member is at least partially wrapped, and a first arm member and a second arm member movable relative to each other between a first position and a second position, wherein the cutting apparatus is more compact in the first position then in the second position.

In one aspect, a cutting apparatus is provided an includes a wire cutting member, a plurality of wheels about which the wire cutting member is at least partially wrapped, a first arm member supporting at least one of the plurality of wheels, and a second arm member supporting at least one of the plurality of wheels. The first arm member and the second arm member are moveable relative to each other between a first position, in which the cutting apparatus has a first size, and a second position, in which the cutting apparatus has a second size larger than the first size.

In one aspect, the first arm member and the second arm member may be rotatable between the first position and the second position.

In one aspect, the cutting apparatus may have a width of about twelve inches, depth of about twelve inches and a height greater than the width and the depth when in the first position.

In one aspect, the width of the cutting apparatus may be greater when in the second position.

In one aspect, the cutting apparatus may have a first width in the first position and a second width in the second position. The second width may be greater than the first width.

In one aspect, a wire saw is provided and includes a wire cutting member, a plurality of wheels about which the wire cutting member is at least partially wrapped, and an adjustment member coupled to at least one of the plurality of wheels for moving the at least one of the plurality of wheels to adjust a tension of the wire cutting member.

In one aspect, the at least one of the plurality of wheels may be moveable between a first position and a second position. The wire cutting member may have a greater tension when the at least one of the plurality of wheels is in the first position than when in the second position.

In one aspect, the adjustment member may be coupled to at least two of the plurality of wheels for moving the at least two of the plurality of wheels to adjust a tension of the wire cutting member.

In one aspect, the adjustment member may include a plate and an actuator, and the at least one of the plurality of wheels may be coupled to the plate. The actuator may be actuated to move the plate and the at least one of the plurality of wheels to adjust tension of the wire cutting member.

In one aspect, the adjustment member may be moveable between a first position, in which the wire cutting member has an adequate tension to perform a cutting operation, and a second position, in which the wire cutting member has a reduced tension to facilitate removal of the wire cutting member from the plurality of wheels.

In one aspect, the wire saw may further include a first arm member supporting at least one of the plurality of wheels and a second arm member supporting at least one of the plurality of wheels.

In one aspect, each of the first arm member and the second arm member may include a first portion and a second portion rotatable relative to each other between a first position, in which the first portion and the second portion are coupled together, and a second position, in which the first portion and the second portion are uncoupled and spaced-apart from one another to provide a gap there between.

In one aspect, the wire cutting member may be removable from the plurality of wheels with the adjustment member in the second position and the first portions and the second portions of the first and second arm members in the second position.

In one aspect, the wire cutting member may be between about 95 inches and about 105 inches.

In one aspect, a wire saw is provided and includes a frame, a housing coupled to and moveable relative to the frame, a plurality of wheels coupled to the housing, a wire cutting member wrapped at least partially around the plurality of wheels, and a visual indicator for indicating an amount of tension applied to the wire cutting member.

In one aspect, the wire saw may further include a coupling member coupled to the frame and configured to rigidly couple the frame to an object. The housing may be configured to move relative to the frame and the object.

In one aspect, the visual indicator may have a first state, in which the tension applied to the wire cutting member is within a range, and a second state, in which the tension applied to the wire cutting member is outside the range.

In one aspect, the range may be about 40 pounds to about 60 pounds.

In one aspect, the wire saw may further include an adjustment assembly coupled to the frame and the housing and configured to move the housing relative to the frame. The adjustment assembly may include a handle and the first state may be a gap between the handle and the frame.

In one aspect, the gap may be within a range of sizes, and the second state may be one of an absence of a gap or a gap outside the range of sizes.

In one aspect, the wire saw may further include an adjustment assembly coupled to the frame and the housing and configured to move the housing relative to the frame. The adjustment assembly may include a handle, and the visual indicator may be provided at least in part by at least one of the handle and the frame.

In one aspect, the wire saw may further include an adjustment assembly coupled to the frame and the housing and configured to move the housing relative to the frame. The adjustment assembly may include a handle, and the visual indicator may be a gap between the handle and the frame.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 4 is a front view of the cutting apparatus shown in FIG. 1 with the cutting apparatus shown in the storage position, according to one aspect of the present disclosure.

FIG. 5 is a top view of the cutting apparatus shown in FIG. 1 with the cutting apparatus shown in the storage position, according to one aspect of the present disclosure.

FIG. 6 is a right side view of the cutting apparatus shown in FIG. 1 with the cutting apparatus shown in the storage position, according to one aspect of the present disclosure.

FIG. 18 is a front view of a portion of the cutting apparatus shown in FIG. 1 with one example of a visual indicator, according to one aspect of the present disclosure.

DETAILED DESCRIPTION

Figure 1:
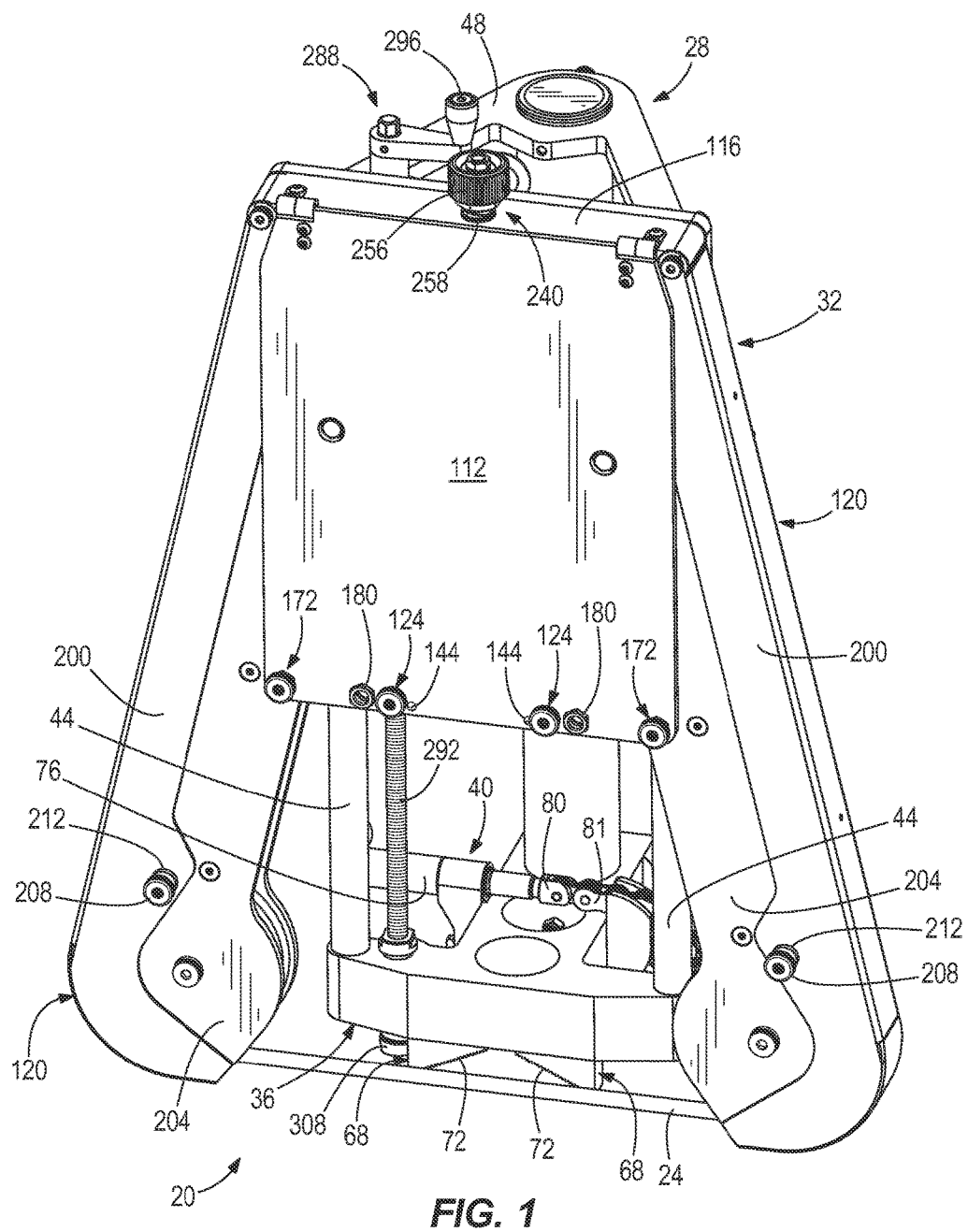
FIG. 1 is a top, front perspective view of one example of a cutting apparatus with the cutting apparatus shown in an operating position, according to one aspect of the present disclosure.
Figure 2:
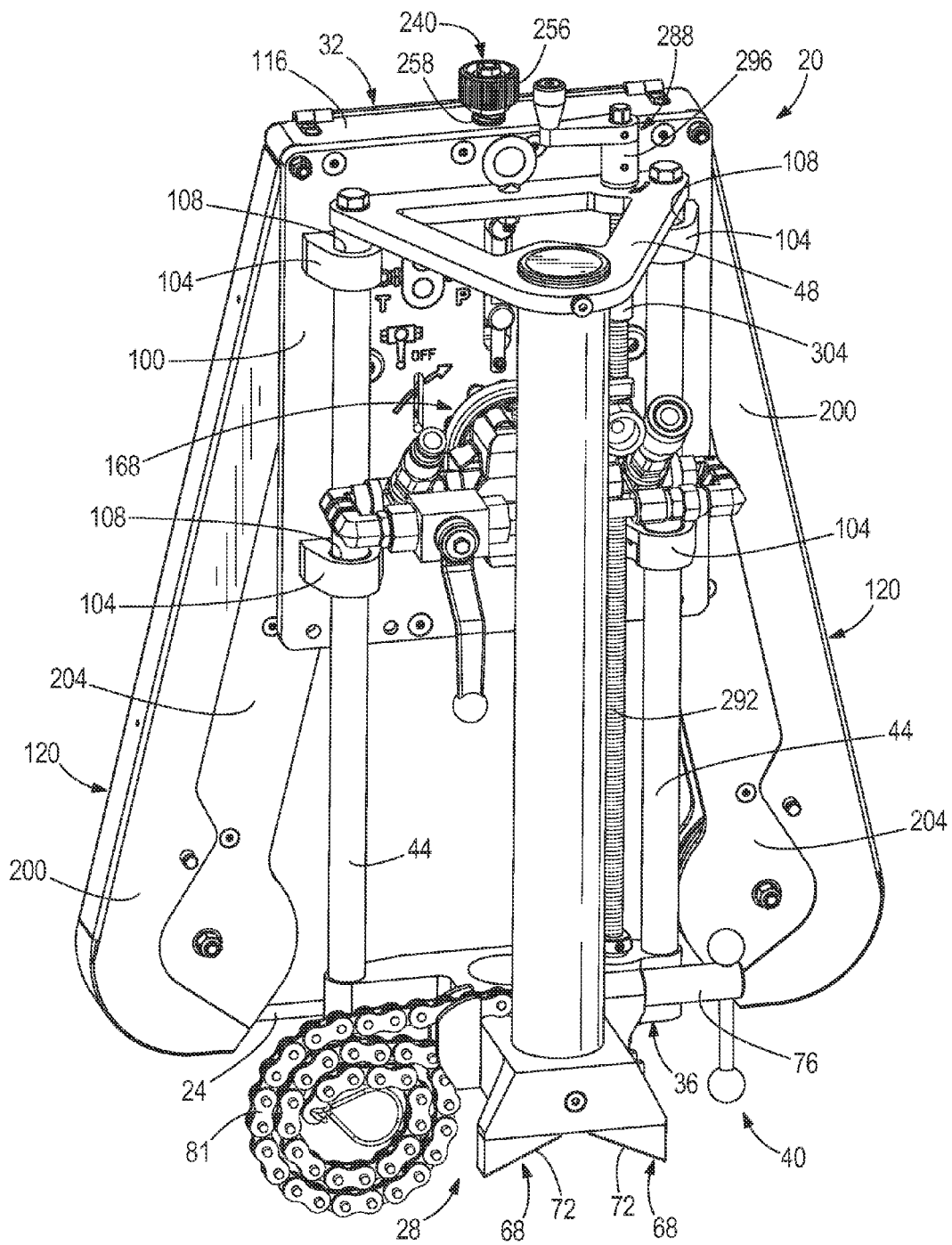
FIG. 2 is a top, rear perspective view of the cutting apparatus shown in FIG. 1, according to one aspect of the present disclosure.
Figure 3:
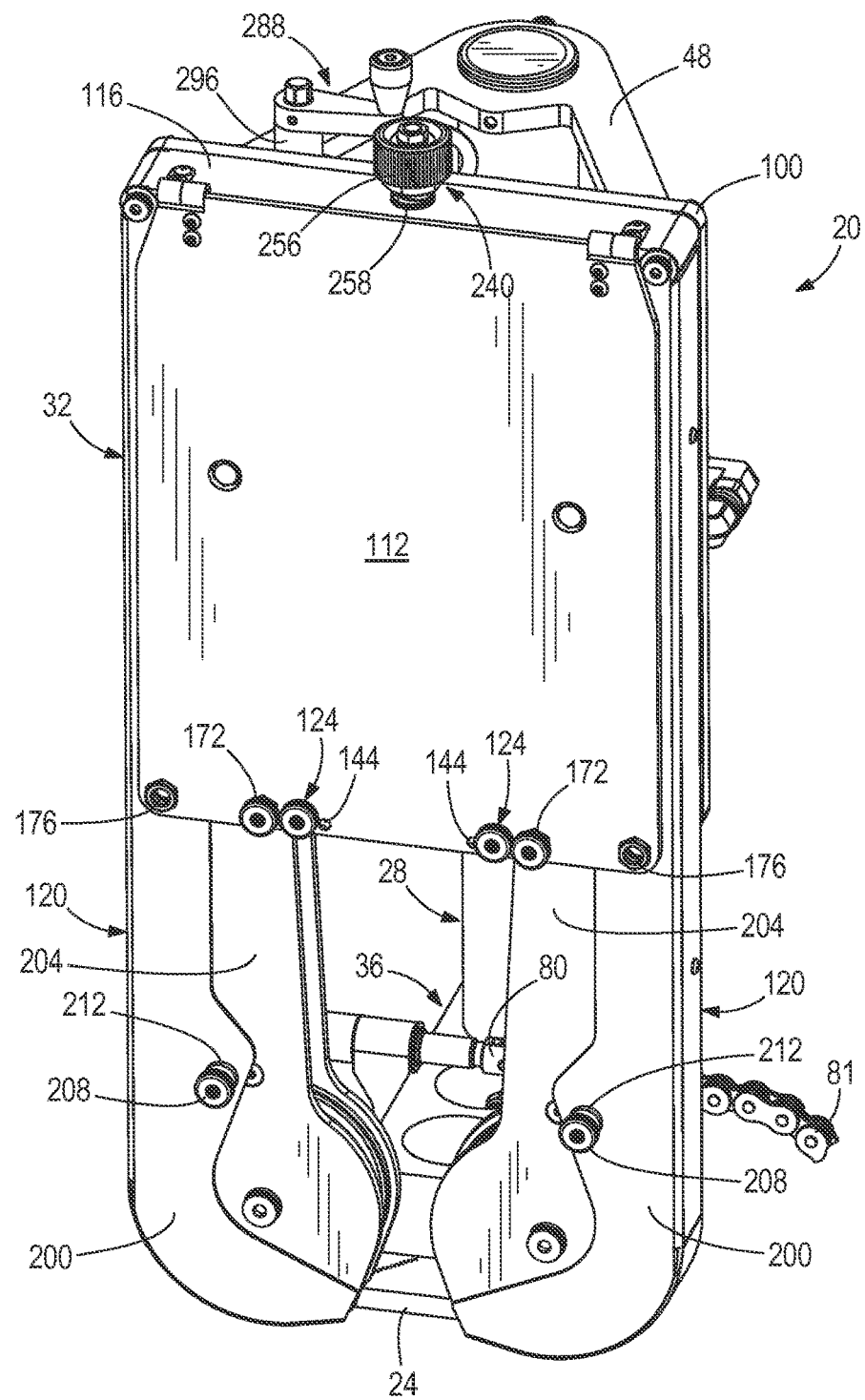
FIG. 3 is top, front perspective view of the cutting apparatus shown in FIG. 1 with the cutting apparatus shown in a storage position, according to one aspect of the present disclosure.

Referring to FIGS. 1-3, one example of a cutting apparatus 20 is shown. The cutting apparatus 20 may also be referred to as a wire saw. In this example, the cutting apparatus 20 is moveable between a first or operating position (see FIGS. 1 and 2) and a second, inoperable or storage position (see FIG. 3). When the cutting apparatus 20 is in the operating position, the cutting apparatus 20 is capable of cutting an object. The cutting apparatus 20 is adapted to cut a wide variety of objects. In one aspect, the cutting apparatus 20 is adapted to cut a cylindrical, hollow pipe. In such an example, the cutting apparatus 20 may cut a variety of different diameter pipes. For example, the cutting apparatus 20 may be able to cut a pipe having an outer diameter of up to about 9.6 inches.

In the storage position, the cutting apparatus 20 is very compact and can be introduced into a lot of small or tight environments that conventional cutting apparatuses or wires saws could not be introduced into and, therefore, could not be utilized. Thus, the compactness of the cutting apparatus 20 allows it to be utilized in a vast quantity of additional environments. In one example, the compactness of the cutting apparatus 20 allows the cutting apparatus 20 to pass into and through a manhole in a ground in order to access subterranean environments. Conventional cutting apparatuses and wire saws may not fit through a manhole, thereby precluding such conventional cutting apparatuses and wires saws from being used in subterranean environments.

With continued reference to FIGS. 1-3 and additional reference to FIGS. 4-6, the cutting apparatus 20 has a compact size and shape in both the operating position and in the storage position. With respect to FIGS. 3-6, the cutting apparatus 20 is illustrated in the compact position. In the illustrated example, the cutting apparatus 20 has a width W of about 12 inches, a depth D of about 12 inches, and a height H of about 29 inches in the storage position. The cutting apparatus 20 with these dimensions will be able to easily fit into tight or small spaces such as, for example, through a manhole in the ground. These illustrated dimensions of the cutting apparatus 20 are only an example of a variety of possible dimensions and are not intended to limit the present disclosure. Rather, the cutting apparatus 20 is capable of having other dimensions in the storage position, but still enable the cutting apparatus 20 to be compact and fit into and through small or tight environments. All of such dimensional possibilities of the cutting apparatus 20 are intended to be within the spirit and scope of the present disclosure.

With continued reference to FIGS. 1-6, the cutting apparatus 20 includes a cutting member 24, a frame 28, and a housing 32. In the illustrated example, the cutting member 24 is a wire. In one example, the cutting member 24 may be a braided wire with diamond particles on an exterior thereof. The wire cutting member 24 may be a wide variety of lengths and all of such possibilities are intended to be within the spirit and scope of the present disclosure. In one example, it is a feature of the cutting apparatus 20 to include a wire cutting member 24 of about 95 inches to about 105 inches. The cutting apparatus 20 of the present disclosure is capable of accommodating a wire cutting member 24 of such lengths due to its construction (described in more detail below).

Figure 14:
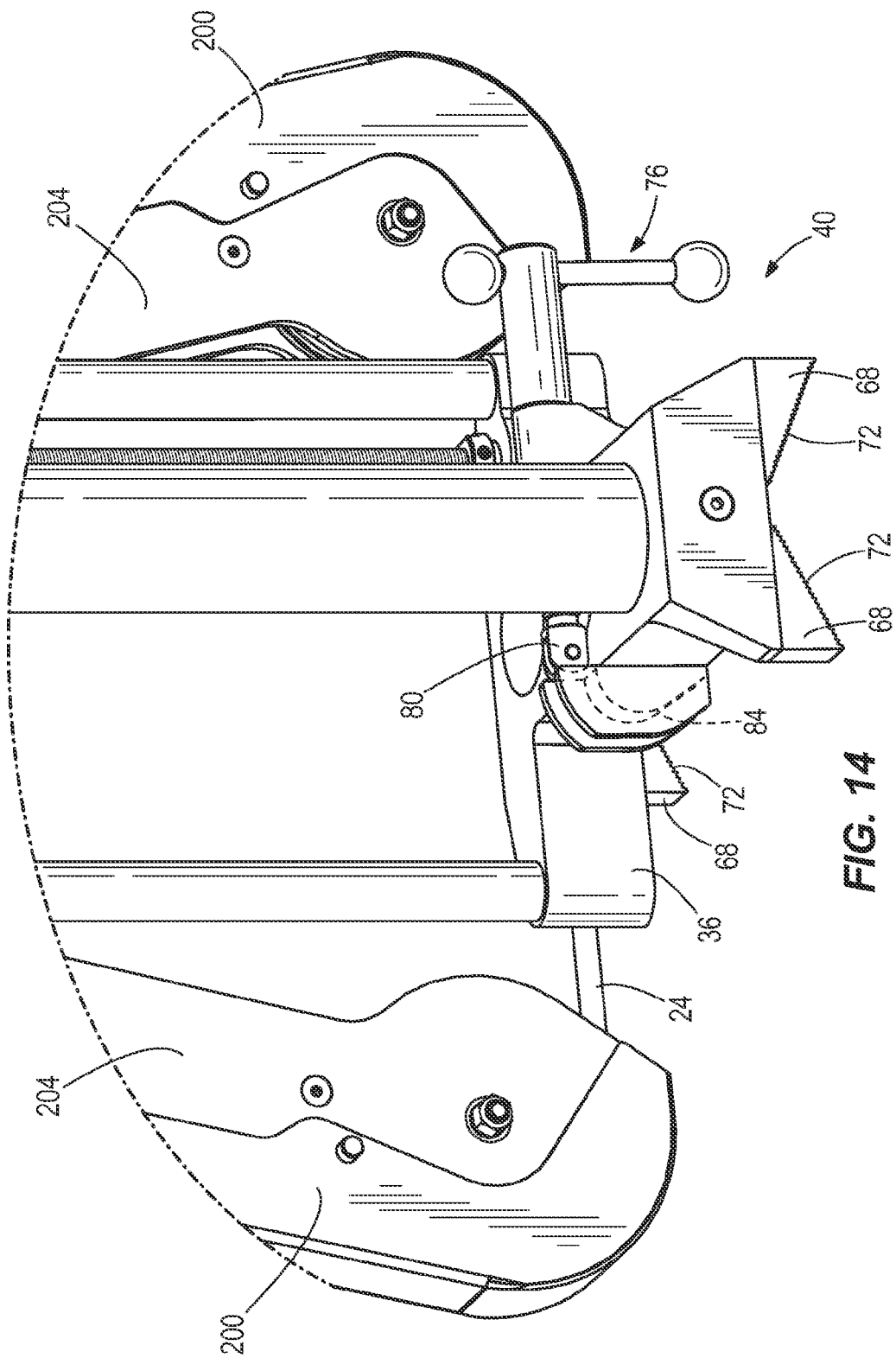
FIG. 14 is a top, rear perspective view of another example of a pipe coupling member of the cutting apparatus shown in FIG. 1, according to one aspect of the present disclosure.

The frame 28 includes a base 36, a coupling member 40 coupled to the base 36, a plurality of support members 44, and a top member 48. The plurality of support members 44 extend between and are coupled to the base 36 and the top member 48. The coupling member 40 is coupled to the base 36 and is adapted to couple the cutting apparatus 20 to an object such as a pipe. The cutting apparatus 20 may include a variety of different coupling members to couple the cutting apparatus 20 to an object. With reference to FIG. 14, the coupling member 40 includes a handle 76, a connector 80, a wrapping member 81, and an engagement surface 84. The wrapping member is selectively wrapped around an object, such as a pipe, and connected to the connector 80. The wrapping member may be a wide variety of wrapping members such as, for example a chain, a strap, etc. Rotation of the handle 76 causes the connector 80 to translate toward or away from the handle 76 depending on the direction of rotation. Translating the connector 80 toward the handle 76 tightens the wrapping member around the object. The engagement surface 84 is arcuate or curved and is engaged by the wrapping member. The arcuate engagement surface 84 assists with equal tightening forces being applied to the object to which the cutting apparatus 20 is attached no matter the size or diameter of the object. Moreover, the arcuate engagement surface 84 ensures the wrapping member extends therefrom at a proper angle that facilies evenly distributed and equal forces are applied to the object. When attaching the cutting apparatus 20 to different size objects, the wrapping member will extend from different points of the arcuate engagement surface 84. The arcuate feature of the engagement surface accommodates the different sized objects and facilitates evenly distributed and equal forces are applied to the object.

The base 36 also includes a plurality of pads 68 adapted to engage an outer surface of an object and assist with coupling the cutting apparatus 20 to the object. The pads 68 include engagement surfaces 72 angled relative to each other and having a surface treatment that results in relatively high friction between the pads 68 and the outer surface of the pipe. In some examples, the engagement surfaces 72 may include projections or teeth.

Referring again to FIGS. 1-6, the housing 32 includes a support plate or rear plate 100 including a plurality of flanges 104 that define apertures 108 there through. The support members 44 of the frame 28 are positioned in the apertures 108, and the support plate 100 and the housing 32 are adapted to move relative to and along the support members 44. The housing 32 also includes a cover 112, a top surface 116, and two arm members 120. The cover 112 is pivotally attached to the top surface 116 and is moveable between a closed position (see FIGS. 1 and 3) and an open position (see FIG. 9).

Figure 8:
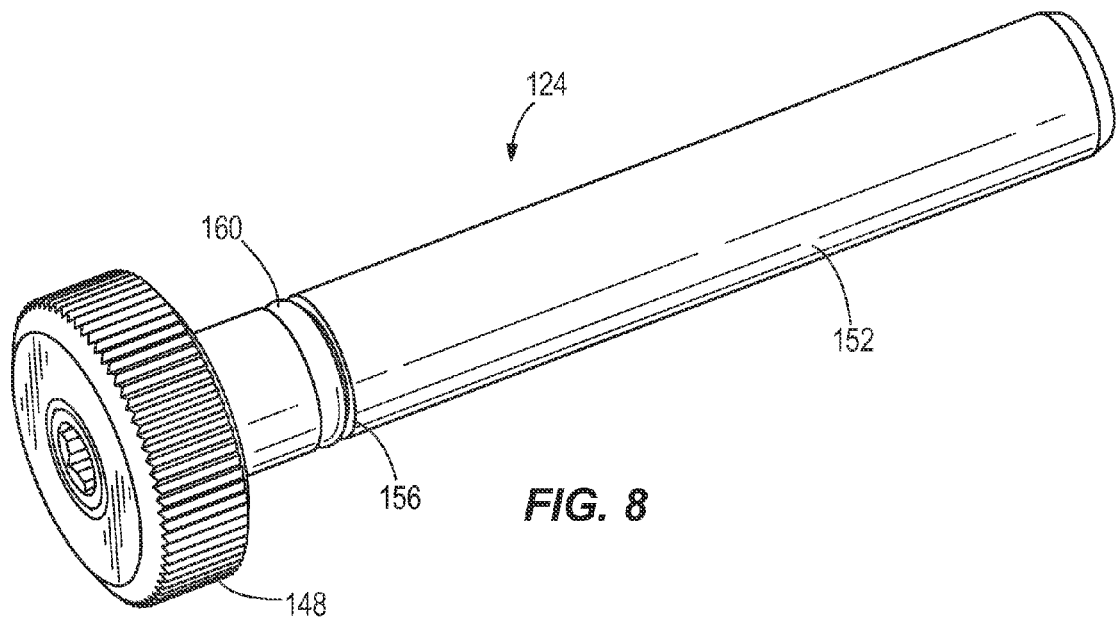
FIG. 8 is a perspective view of one example of a coupling member of the cutting apparatus shown in FIG. 1, according to one aspect of the present disclosure.
Figure 9:
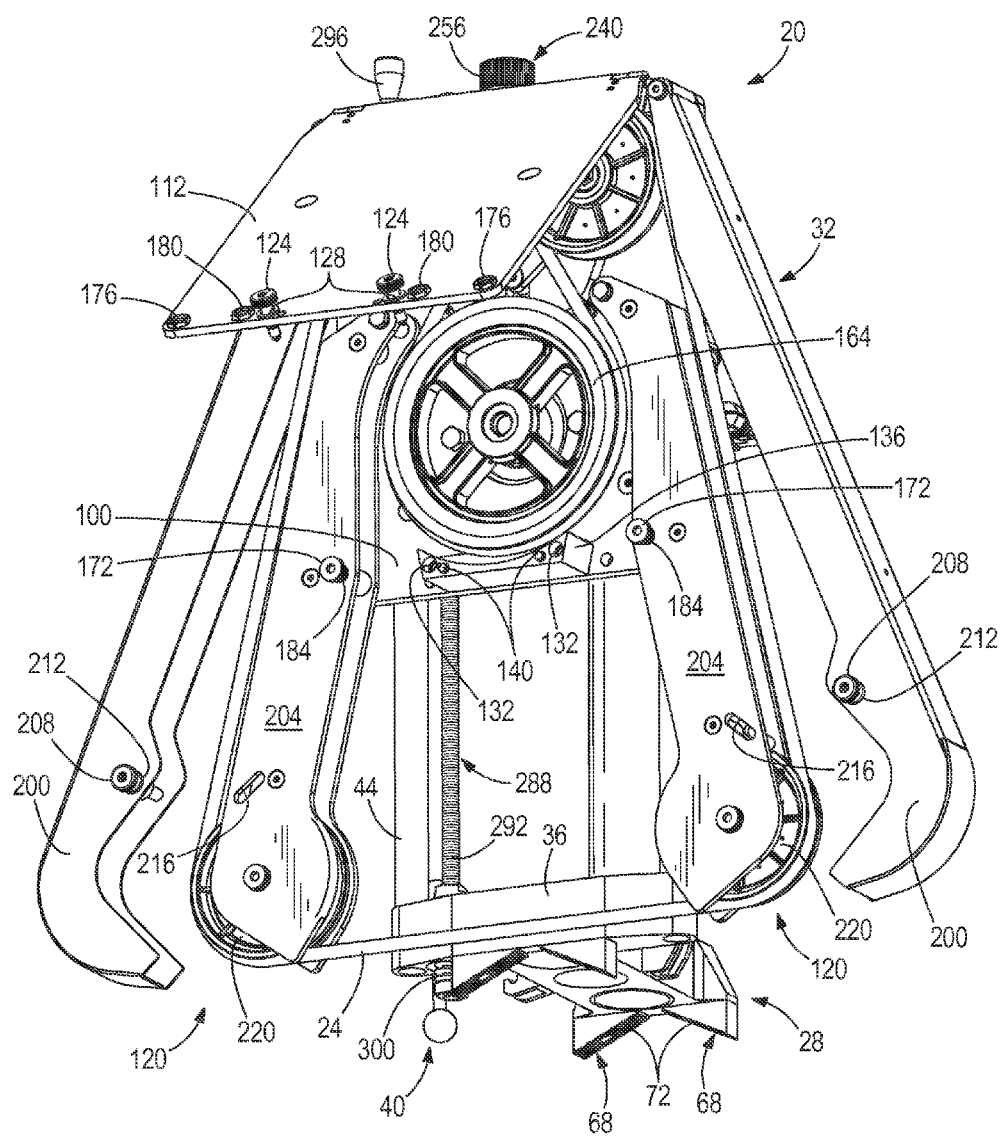
FIG. 9 is a bottom, front perspective view of the cutting apparatus shown in FIG. 1 with the cutting apparatus shown in a wire replacement position, according to one aspect of the present disclosure.

With particular reference to FIGS. 1, 8 and 9, the cutting apparatus 20 includes two pins or coupling members 124 that selectively couple the cover 112 to the housing 32 in a closed position and uncouple the cover 112 from the housing 32 to allow the cover 112 to move to an open position. The cover 112 definers a pair of coupling apertures 128 there through that are aligned with housing apertures 132 defined in a bottom member 136 of the housing 32. When the cover 112 is in the closed position, the apertures 128, 132 are aligned and the coupling members 124 may be inserted into the aligned sets of apertures 128, 132. The coupling members 124 are designed to be able to be manually press-fit into the aligned set of apertures 128, 132 without requiring tools. As will be prevalent after reviewing the present disclosure in its entirety, the cutting apparatus 20 may be set-up, operated, and configured into its storage position all without the use of tools, which eliminates the need to carry or keep track of tools. The bottom member 136 also includes two projections or dowels 140 that are aligned with a pair of alignment apertures 144 defined in the cover 112. The combination of the projections 140 and alignment apertures 144 assists with proper alignment of the sets of apertures 128, 132 to ensure the coupling members 124 may be appropriately inserted to couple the cover 112 to the housing 32 in the closed position.

With particular reference to FIG. 8, the coupling member 124 includes a head 148, a shank 152, a recess 156 defined in a periphery of the shank 152, and a resilient member or O-ring 160 positioned in the recess 156 that projects out of the recess 156 beyond the periphery of the shank 152. The aligned set of apertures 128, 132 is sized larger than the shank 152 of the coupling member 124, but smaller than the extremity or periphery of the O-ring 160 such that the shank 152 inserts smoothly and easily into the aligned set of apertures 128, 132 and the O-ring 160 engages and resists insertion of the coupling member 124 into the aligned set of apertures 128, 132. The resistance may be overcome by an operator pushing harder on the coupling member 124 to fully insert the coupling member 124 into the aligned set of apertures 128, 132. The resistance or friction provided by the O-ring 160 is sufficient to maintain the coupling member 124 in position during operation of the cutting apparatus 20. The operator may remove the coupling members 124 by overcoming the resistance provided by the O-ring 160.

The two arm members 120 are pivotally attached to the support plate 100 and are moveable between a first position (see FIG. 1) associated with the operating position of the cutting apparatus 20, a second position (see FIG. 3) associated with the storage position of the cutting apparatus 20, and a third position or cutting member replacement position (see FIG. 9), in which the cutting member 24 may be removed and/or replaced. A drive wheel 164 is rotatably coupled to and supported by the support plate 100. The drive wheel 164 is also coupled to a drive mechanism 168 (see FIG. 2). The cutting apparatus 20 may include a variety of different types of drive mechanisms. In the illustrated example, the drive mechanism 168 is a hydraulic drive system. Alternatively, the drive mechanism may be a pneumatic drive mechanism, an electric drive mechanism, etc.

Figure 7:
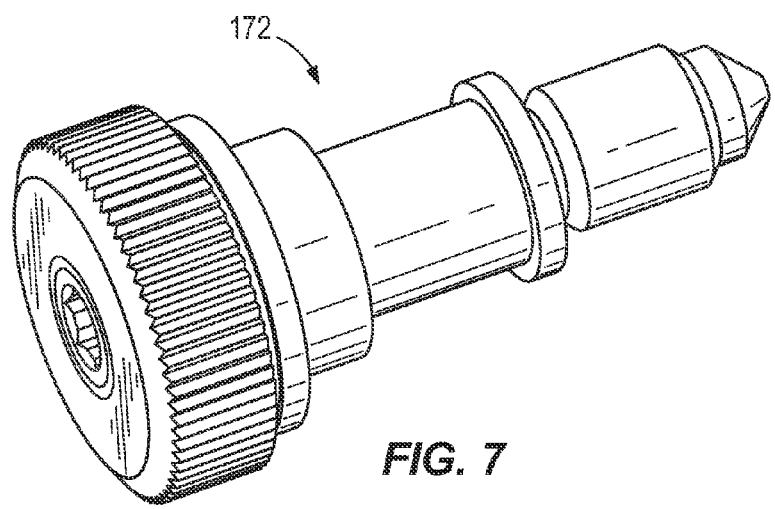
FIG. 7 is a perspective view of one example of a coupling member of the cutting apparatus shown in FIG. 1, according to one aspect of the present disclosure.

The two arm members 120 are secured in the first position and the second position with two pins or coupling members 172. The cover 112 defines a pair of arm apertures 176, 180 therein one for each of the two arm members 120 with a first arm aperture 176 positioned near a corner or outer edge of the cover 112 and a second arm aperture 180 positioned inward from the corner or outer edge and adjacent the respective one of the coupling apertures 128. Each of the two arm members 120 also includes a coupling aperture 184 adapted to receive the coupling members 172 to secure the two arm members 120 in the first position and the second position. When the cutting apparatus 20 is in the operating position, the coupling apertures 184 of the two arm members 120 are aligned with the first arm apertures 176 in the cover 112 and the coupling members 172 are inserted through the aligned sets of apertures 176, 184. To move the cutting apparatus 20 to the storage position, the coupling members 172 are removed, the two arm members 120 are moved inward until the coupling apertures 184 of the two arm members 120 are aligned with the second arm apertures 180 in the cover 112, and the coupling members 172 are inserted into the aligned sets of apertures 180, 184. The coupling members 172 may be similar to the coupling members 124 illustrated in FIG. 8. Alternatively, the coupling members 172 may look like the coupling member illustrated in FIG. 7.

Each of the two arm members 120 includes a first or outer member 200 and a second or inner member 204. The outer member 200 is pivotally coupled to the support plate 100 near the top surface 116 and the inner member 204 is pivotally attached to the support plate 100 a distance from and below the location where the outer member 200 is pivotally attached. By coupling the outer member 200 and the inner member 204 in this manner, the outer member 200 and the inner member 204 may pivot relative to each other to expose the cutting member 24 for removal and replacement of the cutting member 24. The outer member 200 and the inner member 204 are coupled together with a coupling member 208. In one example, the coupling member 208 may be similar to the coupling member 172 shown in FIG. 7. In another example, the coupling member 208 may be similar to the coupling member 124 shown in FIG. 8. An aperture 212 is defined in each of the outer members 200 and an elongated slot 216 is defined in each of the inner members 204. The apertures 212 are aligned with the slots 216 when the outer members 200 and the inner members 204 are coupled together with the coupling members 208. Since the outer members 200 and the inner members 204 have a different point about which they pivot, the outer members 200 and the inner members 204 will move relative to each other as the two arm members 120 move between the first position (see FIG. 1) and the second position (see FIG. 3). The slots 216 accommodate this relative movement between the outer member 200 and the inner member 204 by allowing the coupling member 208 to move within the slot 216.

Figure 13:
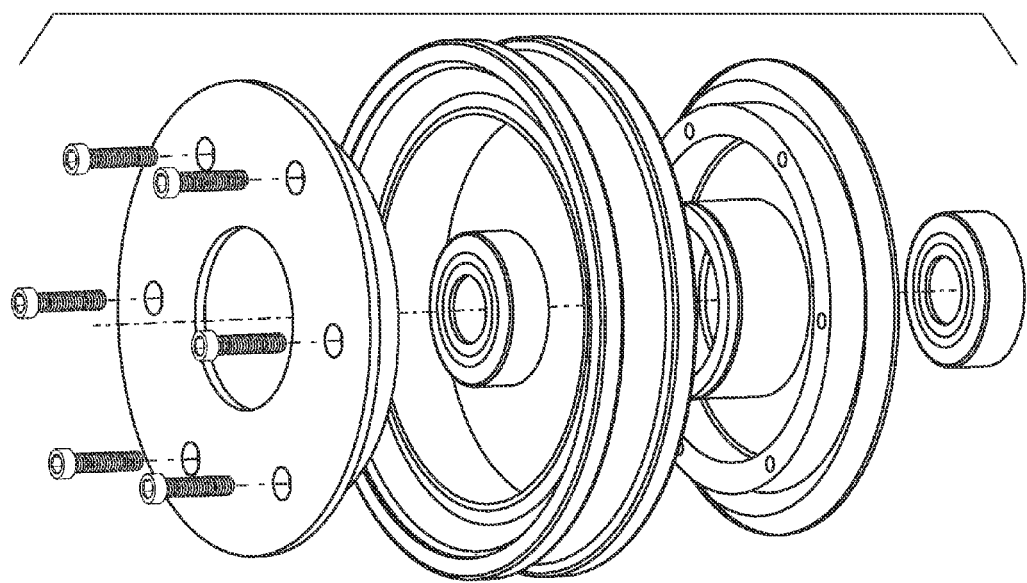
FIG. 13 is an exploded view of a conventional wheel assembly used on conventional cutting apparatuses that is now replaced by the wheel illustrated in FIG. 12.

Referring now to FIGS. 9-12, a wheel 220 is rotatably coupled near a bottom end of each arm member 120 and, in the illustrated example, to each of the inner members 204. Each wheel 220 includes a central hub 224 and an outer body member 228. This wheel design includes significantly less components then conventional wheels used in conventional wire saws (see FIG. 13 for a conventional wheel design including numerous components). Each wheel 220 defines a pair of spaced-apart flanges 232 and a recess 236 between the flanges 232 for receiving the cutting member 24 therein. In one example, the wheels 220 are vulcanized to provide the wheels 220 with sufficient strength and durability to withstand the stresses realized during operation of the cutting apparatus 20.

Figure 10:
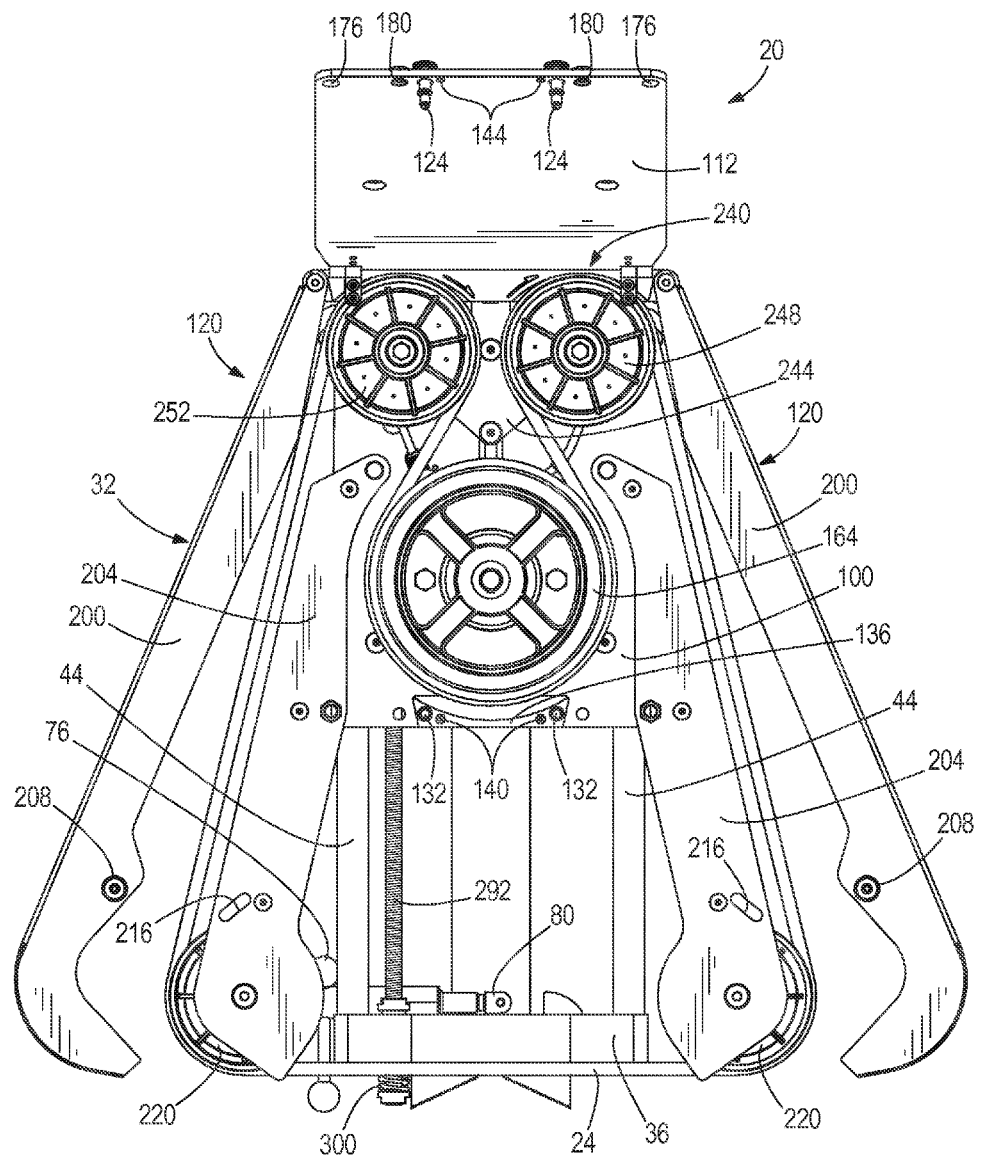
FIG. 10 is front view of the cutting apparatus shown in FIG. 1 with the cutting apparatus shown in the wire replacement position, according to one aspect of the present disclosure.
Figure 11:
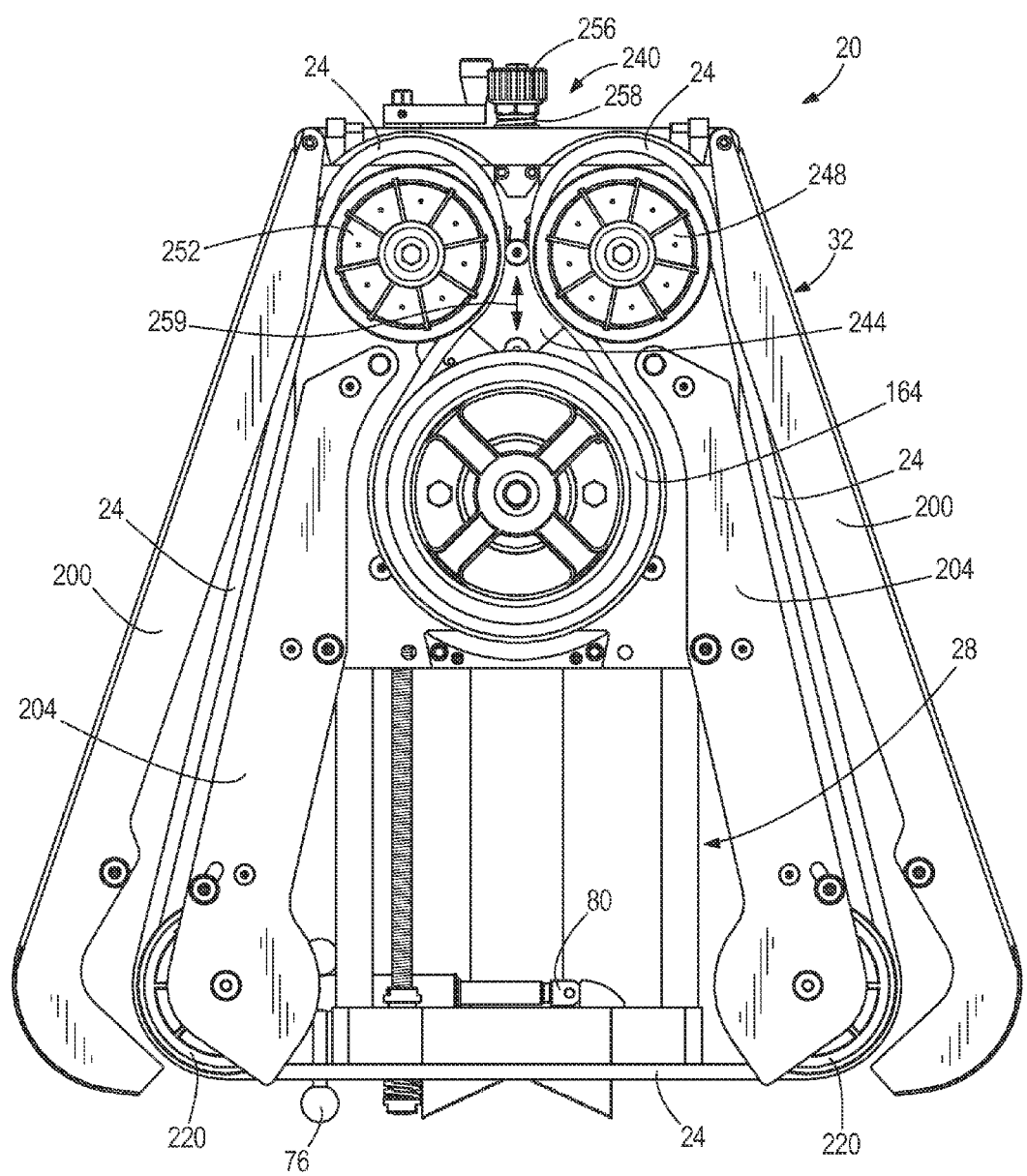
FIG. 11 is a front view of the cutting apparatus shown in FIG. 1 with the cutting apparatus shown in the wire replacement position, a cover removed and a tension adjustment member moved downward to release tension on a wire cutting member of the cutting apparatus, according to one aspect of the present disclosure.
Figure 12:
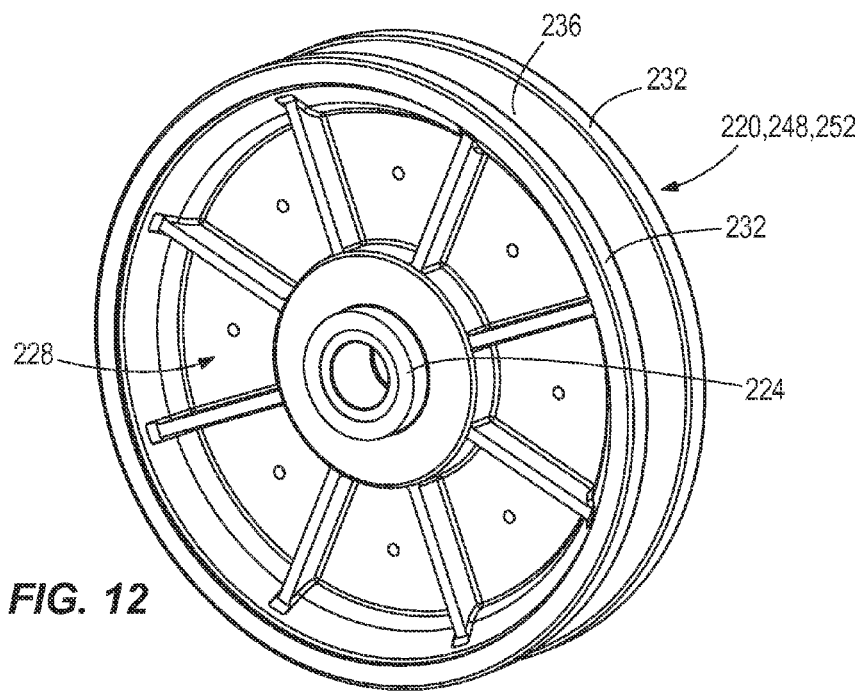
FIG. 12 is a perspective view of one example of a wheel included in the cutting apparatus shown in FIG. 1, according to one aspect of the present disclosure.

With reference to FIGS. 10 and 11, a tension adjustment member 240 is coupled to the housing 32 and is adapted to provide tension to the cutting member 24. The tension adjustment member 240 is adjustable to adjust a quantity of tension applied to the cutting member 24 and may be adjusted to allow removal and replacement of the cutting member 24. The tension adjustment member 240 includes a bracket 244, first and second wheels 248, 252 rotatably coupled to the bracket 244, an actuator 256, and a biasing member 258. In this example, the first and second wheels 248, 252 are similar in structure to the wheel 220 illustrated in FIG. 12. The bracket 244 is coupled to the actuator 256 and is moveable by rotating the actuator 256. In the illustrated example, the bracket 244 moves along a longitudinal extend 259 of the cutting apparatus 20. The actuator 256 may rotate in two directions. Rotating the actuator 256 in one direction causes the bracket 244 to move up and rotating the actuator 256 in the other direction causes the bracket 244 to move down. The first and second wheels 248, 252 move with the bracket 244 as the bracket 244 moves along the longitudinal extent 259 of the cutting apparatus 20. The biasing member 258 is disposed between the actuator 256 and the top surface 116 of the housing 32 to apply an upward bias to the actuator 256.

With reference to FIG. 10, the cutting member 24 is wrapped around the drive wheel 164, the first and second wheels 248, 252 of the tension adjustment member 240 and the two wheels 220 rotatably coupled to the two arm members 120. In FIG. 10, the tension adjustment member 240 is in an upward position and applies sufficient tension to the cutting member 24 for operation of the cutting apparatus 20. The orientation and configuration of all of the wheels 164, 220, 248, 252 of the cutting apparatus 20 enable the cutting apparatus 20 to include a cutting member 24 of a relatively long length. In one example, the cutting member 24 can have a length of about 105 inches. In one example, the cutting member 24 can have a length between about 95 inches and about 120 inches. In one example, the quantity that the cutting member 24 wraps around each of the wheels 164, 220, 248, 252 may be specifically designed to inhibit slippage between the cutting member 24 and the wheels 164, 220, 248, 252 during operation and provide sufficient support to the cutting member 24. Additionally, in the illustrated example, all of the wheels 164, 220, 248, 252 are aligned and centered in a common plane, which inhibits drifting and pitching of the wheels 164, 220, 248, 252 during operation of the cutting apparatus 20.

With reference to FIG. 11, the tension adjustment member 240 has been lowered by rotating the actuator 256 in a first direction, which also lowers the first and second wheels 248, 252 of the tension adjustment member 240 and reduces or releases the tension applied to the cutting member 24 by the first and second wheels 248, 252. With the tension applied to the cutting member 24 reduced or released, the cutting member 24 may be removed from all the wheels 164, 220, 248, 252. Another cutting member 24 may replace the previous cutting member 24. The new cutting member 24 is wrapped around the drive wheel 164, the first and second wheels 248, 252 of the tension adjustment member 240 and the two wheels 220 rotatably coupled to the two arm members 120. The tension adjustment member 240 is then raised by rotating the actuator 256 in a second direction opposite the first direction, which raises the first and second wheels 248, 252 to increase or apply tension to the cutting member 24. The actuator 256 is rotated until a desired quantity of tension is applied to the cutting member 24. In one example, a desired quantity of tension may be applied to the cutting member 24 by rotating the actuator 256 until it bottoms out or engages the top surface 116, then backing-off or rotating the actuator 256 in an opposite direction to slightly displace the actuator 256 from the top surface 116. The amount that the actuator 256 is backed-off can be a known quantity to provide the desired tension. In this example, the amount of tension applied to the cutting member 24 may be between about 30 pound force and about 40 pound force.

It is desirable to apply a tension to the cutting member 24 that enables the cutting member 24 to bend or deflect upward when the cutting member 24 engages the object such as a pipe. By having the bend in the cutting member 24, more surface area of the cutting member 24 is engaging the object rather than just a small surface area if the cutting member 24 is too taut and extends straight or substantially straight across between the two wheels 220. Greater surface area engagement between the cutting member 24 and the object facilitates more effective cutting of the object.

Figure 15:
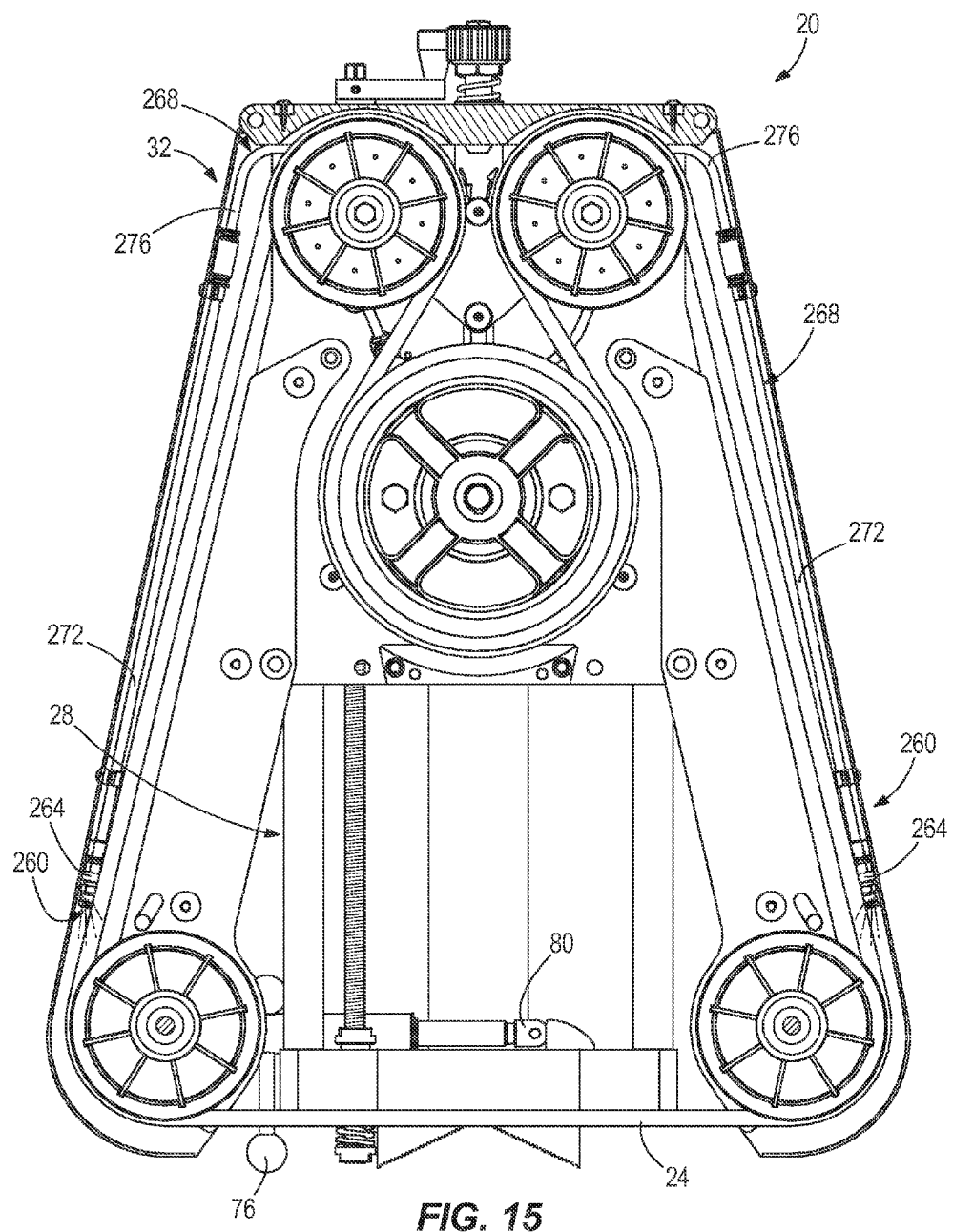
FIG. 15 is a front view of the cutting apparatus shown in FIG. 1 with a portion of the cutting apparatus broken away to expose one example of a liquid dispensing assembly of the cutting apparatus, according to one aspect of the present disclosure.
Figure 16:
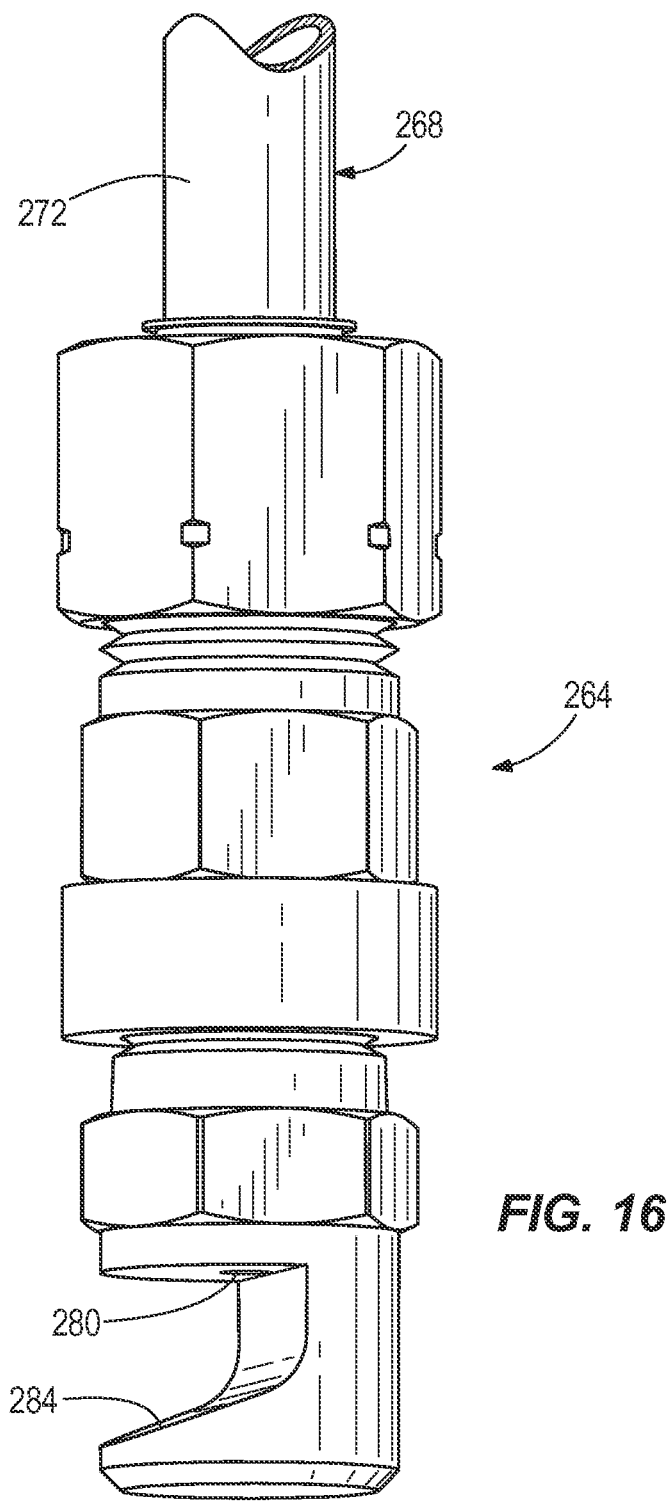
FIG. 16 is a perspective view of one example of a dispenser of the liquid dispensing assembly shown in FIG. 15, according to one aspect of the present disclosure.
Figure 17:
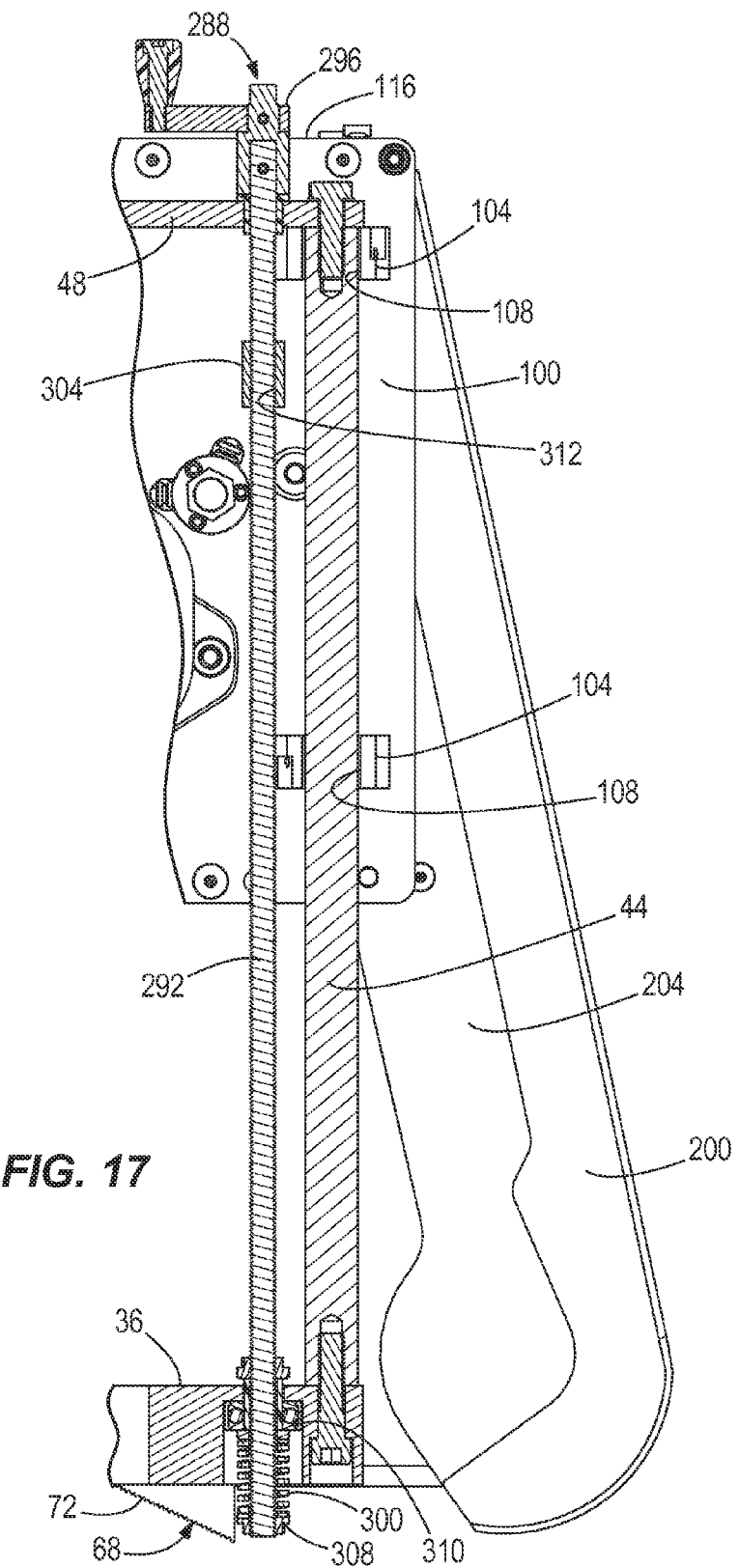
FIG. 17 is a cross-sectional view of the cutting apparatus shown in FIG. 1 taken along a vertical plane through a height adjustment assembly, according to one aspect of the present disclosure.

Referring now to FIGS. 15 and 16, the cutting apparatus 20 includes a liquid dispensing assembly 260 adapted to dispense liquid to assist with cooling portions of the cutting apparatus 20 during operation. A large quantity of heat can be realized when using the cutting apparatus 20 to cut an object. Excessive quantities of heat can undesirably damage the cutting member 24 and/or components of the cutting apparatus 20. Thus, the liquid dispensing assembly 260 assists with inhibiting excessive heat during operation. The liquid dispensing assembly 260 also decreases the amount of debris that moves upward into the cutting apparatus 20 during operation of the cutting apparatus 20. The liquid dispensed from the liquid dispensing assembly 260 engages debris, captures the debris and falls or runs downward, thereby bringing the debris with it as it falls. Excessive debris buildup in the cutting apparatus 20 may negatively affect operation of the cutting device and/or damage the cutting apparatus 20. In one example, the liquid is water.

The liquid dispensing assembly 260 includes two dispensers or sprayers 264 and two conduits 268 for communicating liquid to the dispensers 264. One dispenser 264 is coupled to an interior surface of each of the outer members 200 of the two arm members 120. One conduit 268 is associated with each of the dispensers 264 to communicate liquid to the respective dispenser 264. Each conduit 268 includes a rigid portion 272 coupled to the interior surface of the outer member 200 and a flexible portion 276 coupled to the rigid portion 272 near the point where the outer member 200 pivots relative to the support plate 100. This flexible portion 276 flexes when the two arm members 120 move between the operating position and the storage position to accommodate this movement. If the conduit was completely rigid, the conduit may break or fracture due to the movement of the two arm members 120.

With continued reference to FIGS. 15 and 16, the two dispensers 264 dispense a liquid onto the cutting member 24 and the adjacent wheel 220 at or near the location where the cutting member 24 engages the wheel 220. Each dispenser 264 includes a liquid exhaust aperture 280 and a deflector 284 for deflecting the exhausted liquid at a desired angle. In the illustrated example, the deflector 284 is angled to deflect the liquid at or near the point where the cutting member 24 engages the wheel 220.

Referring now to FIGS. 1, 2, 17 and 18, the cutting apparatus 20 includes a height adjustment assembly 288 adapted to vertically move the housing 32 and associated components relative to the frame 28. As the cutting apparatus 20 cuts an object, the frame 28 remains stationary relative to the object while the housing 32 and associated components move downward through the object to completely cut through the object. In the illustrated example, the direction of movement is in a downward direction. However, the cutting apparatus 20 may be oriented in any direction and, therefore, may move through an object in any direction.

The height adjustment assembly 288 includes a shaft 292, a handle 296, a biasing member 300, and a block 304. The shaft 292 is coupled to and supported by the base 36 and the top member 48 of the frame 28 such that the shaft 292 can rotate relative to the base 36 and top member 48 about a longitudinal central axis of the shaft 292, but is prohibited from moving vertically or axially along the axis. The shaft 292 has external threads defined in an exterior thereof. The handle 296 is fixedly coupled to the top end of the shaft 292 and is manipulatable by an operator to rotate the shaft 292 in two directions. The biasing member 300 is concentrically positioned around the second end of the shaft 292. The biasing member 300 is positioned between a bottom support member 308 and a bearing 310. The block 304 is fixedly coupled to the support plate 100 and defines an aperture 308 there through from a top surface of the block 304 to a bottom surface of the block 304. The block 304 may be fixedly coupled to the support plate 100 in a variety of manners including, but not limited to, fastening, welding, adhering, unitarily forming as one-piece with the support plate 100, etc. The aperture 308 defines internal threads therein that are complementary to the external threads on the shaft 292. Rotation of the shaft 292 via the handle 296 in a first direction causes the block 304, housing 32 and associated components to move through an object (e.g., downward as illustrated) and rotation of the shaft 292 via the handle 296 in a second direction opposite the first direction causes the block 304, the housing 32 and associated components to move back out of the object (e.g., upward as illustrated).

The operational examples of the cutting apparatus 20 described herein are only some of the many different ways of operating the cutting apparatus 20 and are not intended to be limiting upon the present disclosure.

With the cutting apparatus 20 in its storage position, the cutting apparatus 20 is compact and can be transported, such as by carrying, to a variety of environments that conventional cutting apparatuses could not previously be transported to. For example, the cutting apparatus 20 may easily pass through a manhole opening in the ground to perform work on subterranean pipes. Conventional cutting apparatuses may be too large to pass through a manhole. Once the cutting apparatus 20 is at or near a desired cutting location, the cutting apparatus 20 may either be initially coupled to an object or initially moved from its storage position to its operating position. For purposes of this exemplary operational description, the object will be described as a pipe. However, the cutting apparatus 20 is adapted to cut a wide variety of objects and the description herein pertaining to a pipe is not intended to be limiting to the present disclosure.

The cutting apparatus 20 is coupled to the pipe with the coupling member 40. As indicated above, the cutting apparatus 20 may include a variety of different coupling members. For purposes of this example, the coupling member 40 illustrated in FIG. 14 will be described. The wrapping member is uncoupled from the connector 80, the cutting apparatus is positioned on top of a pipe such that the engagement surfaces 72 engage the pipe, the wrapping member is wrapped around the pipe, the wrapping member is coupled again to the connector 80, and the handle 76 is rotated in a direction that causes the connector 80 to translate toward the handle 76, thereby tightening the wrapping member around the pipe. The handle 76 is rotated until a desired amount of tension and forces are applied to the pipe to ensure a secure coupling of the cutting apparatus 20 to the pipe. The wrapping member will engage and extend from the arcuate engagement surface 84 at a location dependent upon the size or diameter of the pipe.

Once the cutting apparatus 20 is coupled to the pipe with the coupling member 40, the cutting apparatus 20 is moved to its operating position. The pins or coupling members 172 are removed from the aligned set of apertures 180, 184 and the two arm members 120 are moved outward until the apertures 184 in the two arm members 120 align with the first 176 apertures in the cover 112 associated with the operating position. The pins or coupling members 172 are then inserted into the newly aligned set of apertures 176, 184.

The cutting apparatus 20 may be activated prior to or after engaging the cutting member 24 with the pipe. In this example, the cutting apparatus 20 will be active prior to lowering the cutting member 24 into engagement with the pipe.

After activation of the cutting apparatus 20, the cutting member 24 is lowered to engage the pipe with a proper amount of force. The cutting member 24, the housing 32 and associated components are lowered by rotating the handle 296 in the first direction. The cutting member 24, the housing 32 and the associated components continue to move downward until the cutting member 24 engages the pipe. As the cutting member 24 engages the pipe, the cutting member 24 begins to bend or deflect upward. The amount of tension applied to the cutting member 24 by the tension adjustment mechanism 240 determines the amount of bend or deflection. Continuing to rotate the handle 296 after engagement of the cutting member 24 with the pipe causes the force applied by the cutting member 24 to increase. Once the force applied to the pipe equals a predetermined desired amount of force, a visual indicator 316 (see FIG. 18) conveys to an operator that the desired amount of force has been achieved. In one example, the predetermined amount of force may be a range of forces.

In the illustrated example, the visual indicator 316 is a gap between the handle 296 and the top member 48 as shown in FIG. 18. Prior to the cutting member 24 applying the predetermined amount of force to the pipe, a gap is not present between the handle 296 and the top member 48. Only after the cutting member 24 applies the predetermined amount of force to the pipe does the gap 316 begin to appear. The amount of predetermined desired force that facilitates the visual indicator 316 can be a wide variety of forces and can be selected depending on the use of the cutting apparatus 20. In one example, the predetermined desired amount of force can be about 50 pound force. In another example, the predetermined desired amount of force can be between about 40 pound force and about 60 pound force. Other amounts of force and ranges of forces are contemplated and are intended to be within the spirit and scope of the present disclosure.

By applying the predetermined desired amount of force to the pipe, the cutting member 24 will effectively cut the pipe. If the cutting member 24 applies a different amount of force to the pipe, the cutting apparatus 20 may not effectively and/or efficiently cut the pipe.

The handle 296 needs to continue to rotate in order to continue cutting the pipe. Additionally, it is desirable for the cutting member 24 to continue to apply the predetermined quantity of force to the pipe. As the operator continues to rotate the handle 296, the operator must rotate the handle 296 at a rate that maintains the gap 316 between the handle 296 and the top member 48 in order to continue to apply the predetermined desired amount of force to the pipe. If the handle 296 is rotated too quickly or too slowly, the gap 316 will respectively become too large or dissipate, thereby resulting in excessive or insufficient force being applied to the pipe. Application of excessive or insufficient force to the pipe may result in ineffective cutting of the pipe.

The visual indicator 316 may be provided by the cutting apparatus 20 in a variety of manners and all possibilities are intended to be within the spirit and scope of the present disclosure. In one example, the visual indicator 316 is at least partially provided by the two biasing members 258, 300 working in combination. The strengths, resistances or biasing forces provided by the two biasing members 258, 300 are selected based on the predetermined amount of force that is desired to be applied to the pipe. The strengths, resistances or biasing forces of the two biasing members 258, 300 may be the same or may be different.

It may be desirable to remove and replace a cutting member 24. For example, a cutting member 24 may wear out, be damaged, or a different type of cutting member 24 may be desired based on the type of object to be cut. The cutting member 24 may be removed from the cutting apparatus 20 when the cutting apparatus 20 is in either the storage position or the operating position (i.e., with the two arm members 120 inward or outward). For purposes of this example, which is not intended to be limiting, the removal and replacement of the cutting member 24 will be described and illustrated with the cutting apparatus 20 in the operating position (i.e., with the two arm members 120 in outward positions). To remove the cutting member 24, the pins or coupling members 208 are removed from the aligned apertures 212 and slots 216, and all of the pins or coupling members 124, 172 are removed from the cover 112. With the coupling members 124, 172, 208 removed, the outer members 200 can be pivoted outward away from the inner members 204 and the cover 112 is pivoted upward to expose the cutting member 24. The actuator 256 is then rotated to move the tension adjustment member 240 downward to decrease or release the tension on the cutting member 24. The actuator 256 is rotated until tension is sufficiently reduced on the cutting member 24 to enable the cutting member 24 to be removed from the wheels 164, 220, 248, 252. Alternatively, the tension may be reduced prior to removing the pins or coupling members and moving the cover 112 and the outer members 200.

A cutting member 24 may then be placed back onto the wheels 164, 220, 248, 252, tensioned, and covered by reversing the steps described above.

It should be understood that when an element or component is, for example, coupled, secured, attached, mounted, connected, variants thereof, or equivalents thereof, to or with another element or component that such elements or components may be either unitarily formed as one-piece or separately formed.

It should also be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the cutting apparatus may be utilized in any orientation and use of such terms is intended to correspond to the exemplary orientation of the cutting apparatus illustrated in the drawings. The use of these terms in association with the cutting apparatus is not intended to limit the cutting apparatus to a single orientation or to limit the cutting apparatus in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, inventive subject matter lies in less than all features of a single disclosed embodiment.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A cutting apparatus comprising:
    a wire cutting member;
    a plurality of wheels about which the wire cutting member is at least partially wrapped;
    a first arm member supporting at least one of the plurality of wheels; and
    a second arm member supporting at least one of the plurality of wheels;
    wherein the first arm member and the second arm member are moveable relative to each other between a first position and a second position; and
    wherein the at least one of the plurality of wheels supported by the first arm member is spaced further apart from the at least one of the plurality of wheels supported by the second arm with the first arm member and the second arm member in the second position.

2. The cutting apparatus of claim 1, wherein the first arm member and the second arm member are rotatable relative to each other between the first position and the second position.

3. The cutting apparatus of claim 1, wherein the cutting apparatus has a width of twelve inches, depth of twelve inches and a height greater than the width and the depth when in the first position.

4. The cutting apparatus of claim 3, wherein the width of the cutting apparatus is at least partially defined by a distance between the at least one of the plurality of wheels supported by the first arm member and the at least one of the plurality of wheels supported by the second arm member, wherein the width of the cutting apparatus is greater when in the second position.

5. The cutting apparatus of claim 1, wherein the cutting apparatus has a first width in the first position and a second width in the second position, wherein the first and second widths of the cutting apparatus are at least partially defined by a distance between the at least one of the plurality of wheels supported by the first arm member and the at least one of the plurality of wheels supported by the second arm member, wherein the second width is greater than the first width.

6. The cutting apparatus of claim 1, further comprising an adjustment member coupled to at least one of the plurality of wheels for moving the at least one of the plurality of wheels to adjust a tension of the wire cutting member.

7. The cutting apparatus of claim 6, wherein the at least one of the plurality of wheels is moveable between a first position and a second position, and wherein the wire cutting member has a greater tension when the at least one of the plurality of wheels is in the first position than when in the second position.

8. The cutting apparatus of claim 6, wherein the adjustment member is coupled to at least two of the plurality of wheels for moving the at least two of the plurality of wheels to adjust a tension of the wire cutting member.

9. The cutting apparatus of claim 6, wherein the adjustment member includes a plate and an actuator, and wherein the at least one of the plurality of wheels is coupled to the plate, and wherein the actuator is actuated to move the plate and the at least one of the plurality of wheels to adjust tension of the wire cutting member.

10. The cutting apparatus of claim 6, wherein the adjustment member is moveable between a first position, in which a first tension is applied to the wire cutting member to perform a cutting operation, and a second position, in which a second tension is applied to the wire cutting member to facilitate removal of the wire cutting member from the plurality of wheels.

11. The cutting apparatus of claim 10, wherein
    the first arm member includes a first portion and a second portion rotatable relative to each other between a first position, in which an end of the first portion and an end of the second portion are coupled together, and a second position, in which the end of the first portion and the end of the second portion are uncoupled and spaced-apart from one another to provide a gap between the end of the first portion and the end of the second portion, and
    the second arm member includes a first portion and a second portion rotatable relative to each other between a first position, in which an end of the first portion and an end of the second portion are coupled together, and a second position, in which the end of the first portion and the end of the second portion are uncoupled and spaced-apart from one another to provide a gap between the end of the first portion and the end of the second portion.

12. The cutting apparatus of claim 11, wherein the wire cutting member is removable from the plurality of wheels with the adjustment member in the second position and the first portions and the second portions of the first and second arm members in the second position.

13. The cutting apparatus of claim 1, wherein a length of the wire cutting member is between 95 inches and 105 inches.

14. The cutting apparatus of claim 1, further comprising a visual indicator for indicating an amount of tension applied to the wire cutting member.

15. The cutting apparatus of claim 14, further comprising a coupling member coupled to the frame and configured to rigidly couple the frame to an object, wherein the housing is configured to move relative to the frame and the object.

16. The cutting apparatus of claim 14, wherein the visual indicator has a first state, in which the tension applied to the wire cutting member is within a range, and a second state, in which the tension applied to the wire cutting member is outside the range.

17. The cutting apparatus of claim 16, wherein the range is 40 pounds to 60 pounds.

18. The cutting apparatus of claim 16, further comprising an adjustment assembly coupled to the frame and the housing and configured to move the housing relative to the frame, wherein the adjustment assembly includes a handle, and wherein the first state is a gap between the handle and the frame.

19. The cutting apparatus of claim 14, further comprising an adjustment assembly coupled to the frame and the housing and configured to move the housing relative to the frame, wherein the adjustment assembly includes a handle, and wherein the visual indicator is provided at least in part by at least one of the handle and the frame.

20. The cutting apparatus of claim 14, further comprising an adjustment assembly coupled to the frame and the housing and configured to move the housing relative to the frame, wherein the adjustment assembly includes a handle, and wherein the visual indicator is a gap between the handle and the frame.

21. The cutting apparatus of claim 1, wherein each of the first arm member and the second arm member include a first portion and a second portion rotatable relative to each other between a first position, in which the first portion and the second portion are coupled together, and a second position, in which the first portion and the second portion are uncoupled and spaced-apart from one another to provide a gap there between.

\* \* \* \* \*